H. G. BALDWIN.
ELASTIC WHEEL.
APPLICATION FILED JULY 11, 1911.

1,032,730.

Patented July 16, 1912.
2 SHEETS—SHEET 1.

Witnesses.

Inventor.
Henry G. Baldwin

H. G. BALDWIN.
ELASTIC WHEEL.
APPLICATION FILED JULY 11, 1911.
1,032,730.
Patented July 16, 1912.
2 SHEETS—SHEET 2.
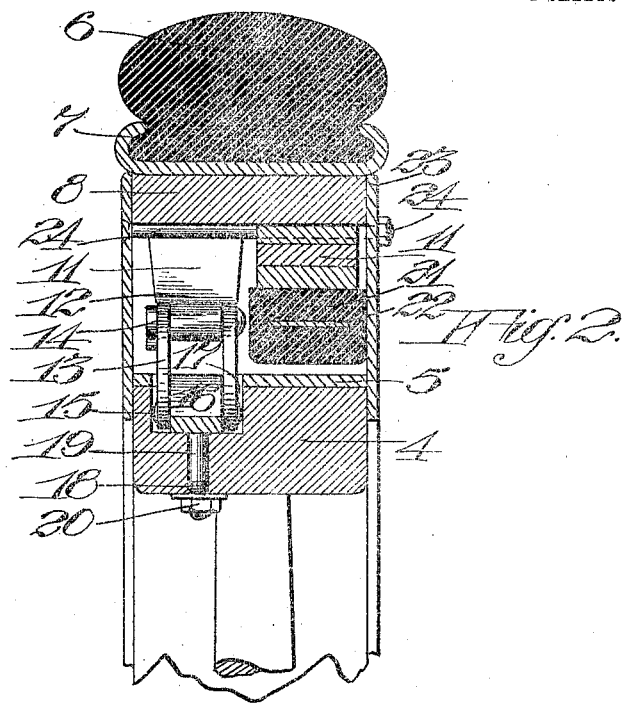
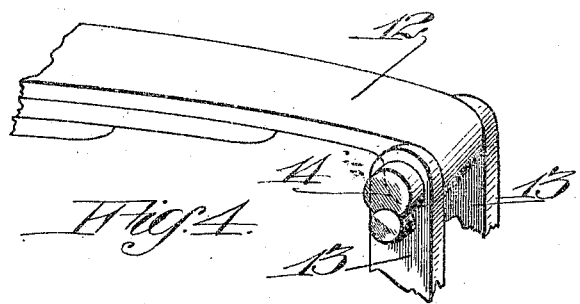
Witnesses
Thos. Eastberg
F. E. Cropard
Inventor.
Henry G. Baldwin.
By G. H. Shoup.
his Atty.

UNITED STATES PATENT OFFICE.

HENRY G. BALDWIN, OF SAN FRANCISCO, CALIFORNIA.

ELASTIC WHEEL.

1,032,730.  Specification of Letters Patent.  Patented July 16, 1912.

Application filed July 11, 1911. Serial No. 637,904.

*To all whom it may concern:*

Be it known that I, HENRY G. BALDWIN, citizen of the United States, residing in the city and county of San Francisco and State of California, have invented new and useful Improvements in Elastic Wheels, of which the following is a specification.

This invention relates to vehicle wheels and particularly to vehicle wheels rendered elastic by the introduction of flexible mediums between a central floating wheel member and a tread portion.

The object of the invention is to provide a substantial, reliable, easily mounted and comparatively inexpensive resilient wheel for vehicles and particularly to provide an elastic wheel involving a plurality of substantial resilient members, flexibly connected to a central wheel and which are adapted to yield or give under the load imposed on the hub of the wheel while the structure is moving over a roadway.

The invention consists of the parts and the construction and combination of parts as hereinafter more fully described and claimed, having reference to the accompanying drawings, in which—

Figure 1:
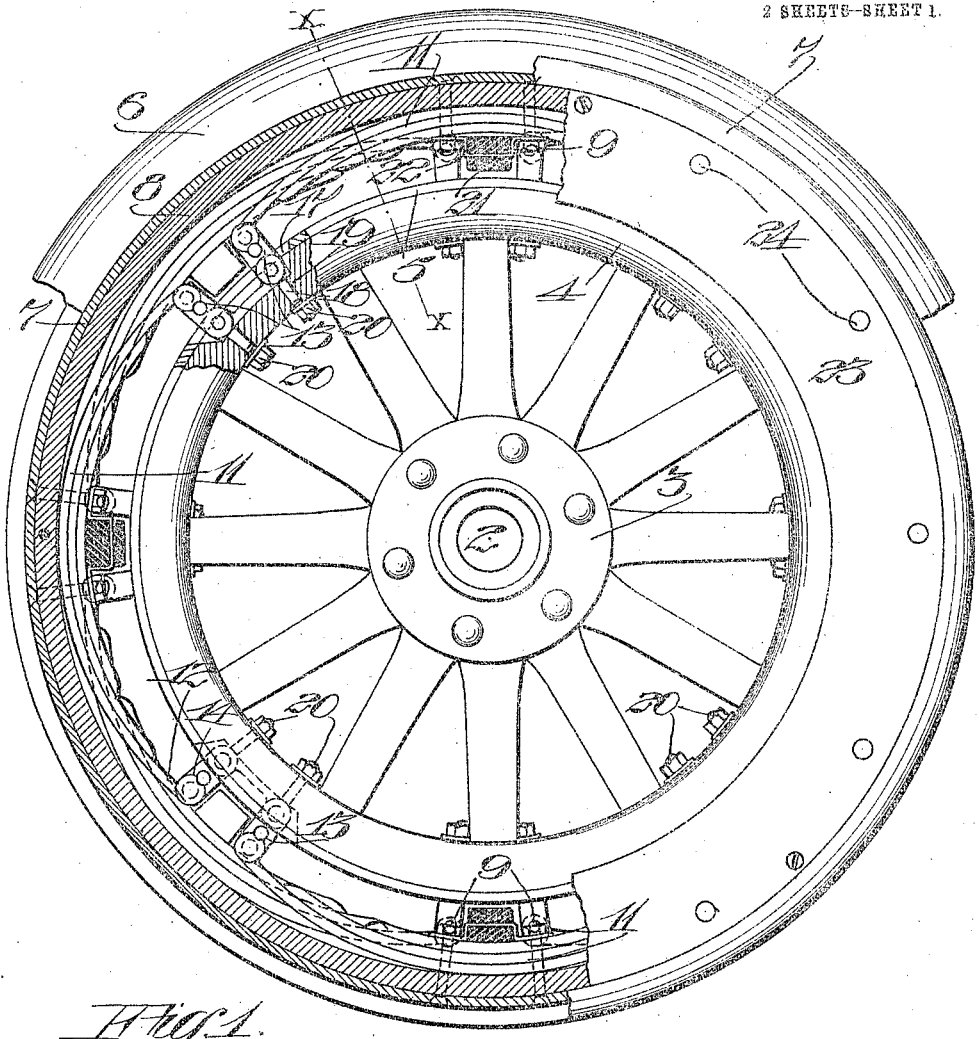
Figure 5:
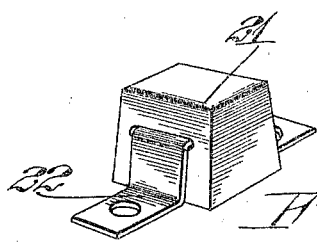

Figure 1 is a side elevation in partial section of the wheel. Fig. 2 is a cross section on line X X, Fig. 1. Fig. 3 is a perspective view of the rubber bumper and supporting bracket. Fig. 4 is a detail view of the leaf spring connecting links.

In the present embodiment of my invention 2 represents a wheel center having a hub 3 and a felly 4 upon the exterior surface of which is appropriately secured a metallic band or rim 5, and the bearing portion of the wheel is indicated as a resilient cushion or rubber tire 6, which is mounted upon a rim 7 of suitable material. The rim 7 is lined with a wooden or other ring 8, which is secured to the rim 7 by a plurality of bolts or other suitable locking devices 9, which project sufficiently through the interior of the rim 7 to receive beneath the nuts 10 of the bolts 9, a plurality of resilient members, here shown as leaf springs 11, of which a suitable number may be employed. The fastening screws or bolts 9 are employed in pairs which are alternately disposed on opposite sides of the peripheral center line through the rim 8. There may be as many sets of springs employed as is desired, and I have shown four sets on each side of the wheel and these sets are alternately disposed relatively to each other, so that the load is equally distributed through all of the several sets of springs under normal conditions.

Certain leaves 11 of the spring sets are of sufficient length to be drawn down toward the band 5 which is secured on the felly 4 on the central wheel and the adjacent ends 12 of sets of springs 11 on their respective sides are secured to the felly 4 by means of links 13 secured to the ends 12 of the springs 11 by suitable pins or other pivot members 14.

The links 13 which are employed in pairs at each of the ends 12 of the springs 11, are mounted upon rivets or other equivalent devices 15 which are secured in substantially U-shaped clips 16. These clips 16 are disposed in slots 17 formed at suitable intervals around the felly 4 and extending radially from the clips 16 are screw threaded shanks 18 which project through perforations 19 in the felly 4, and are adapted to receive locking nuts 20 on their inner ends which are adapted to be jammed up against the inner surface of the felly 4.

As stated, there are four sets of springs 11 on one side of the wheel and four sets on the opposite side which latter are so disposed that their ends 12 are approximately even with that portion of the opposite sets of springs 11 which have their central portions bolted to the rim 7. Preferably, the exterior diameter of the band 5 and the interior diameter of the rim 7 is such as to allow ample space for the mounting of the several sets of springs 11 between them, and to allow a reasonable amount of eccentric movement to the wheel body 2 to and from the rim 7 as different conditions may require.

In order to limit excessive eccentric movement of the wheel components and to prevent injury to the several parts by any excessive movement, I interpose cushions or buffers 21 between the band 5 and the rim 7 and these buffers can be attached very readily by mounting them against the inner of the several springs 11 and securing them in place by suitable clips 22, perforated to pass over the inner ends of the locking bolts 9, and which will be held in place by the nuts 10 when secured down upon the bolts 9.

Foreign material is excluded from access to the space between the outside of the felly 4 and the inside of the rim 7 by attaching upon opposite sides of the wheel, rings 23 of appropriate diameters and thickness, and which rings are held in place against the filler ring 8, by means of bolts 24 which extend transversely through the wheel and when tightened up draw the side rings 23 into snug engagement against the edges of the filler 8 and at the same time the rings embrace the opposite sides of the felly 4 with sufficient friction to substantially operate to exclude sand and dirt and other material from having access to the chamber in which the resilient members are mounted.

I have found by actually constructing these wheels on the principle of my invention that the operation of the wheel is in all respects the same as though a pneumatic or other equivalent tire were employed, and by the use of my wheel I am enabled to dispense with expensive pneumatic tires and all chance of puncturing is eliminated. The cushion tire 6 which I employ may be of such a character as to be strong and durable and is only employed practically for the purpose of making the wheel sound proof in operation, as sufficient resiliency is obtained by the movement of my springs 11.

In actual operation substantially all of the springs save those immediately beneath the center are in constant operation and the work is equally distributed through all of the several springs which are subjected to the load of the wheel.

Having thus described my invention what I claim and desire to secure by Letters Patent is—

1. The combination with a central wheel and an outer bearing rim eccentrically movable relative to the central wheel, of a plurality of sets of springs alternately disposed on the periphery of the inner wheel, said sets of springs being secured adjacent their central portions to the outer member, links connecting the adjacent ends of said springs to the central wheel, clips secured to the inner wheel, said links having inner ends pivotally secured to said clips, and buffers secured under the central portions of the springs and interposed between the eccentrically movable members to prevent excessive movement.

2. The combination in a wheel, of a central structure, with a felly and a tight band thereon, said felly having depressions, a rim engaging a tire, a wooden filler lining the inside of the rim, tensioned springs rigidly secured at their central portion to the filler, said springs being adapted to suspend the central structure, links pivoted to the spring ends, and clips secured in the depressions in the felly and connected to the links.

In testimony whereof I have hereunto set my hand in the presence of two subscribing witnesses.

HENRY G. BALDWIN.

Witnesses:
   JOHN H. HERRING,
   CHARLES EDELMAN.